United States Patent
Patil et al.

(10) Patent No.: US 10,805,781 B2
(45) Date of Patent: Oct. 13, 2020

(54) METHOD AND APPARATUS FOR ESTABLISHING A CONNECTION BETWEEN DEVICES

(71) Applicant: Samsung Electronics Co., Ltd., Gyeonggi-do (KR)

(72) Inventors: Mayuresh Madhukar Patil, Bangalore (IN); Se-Hee Han, Seoul (KR); Venkateswar Jeedigunta, Bangalore (IN)

(73) Assignee: Samsung Electronics Co., Ltd. (KR)

(*) Notice: Subject to any disclaimer, the term of this patent is extended or adjusted under 35 U.S.C. 154(b) by 300 days.

(21) Appl. No.: 14/824,793

(22) Filed: Aug. 12, 2015

(65) Prior Publication Data

US 2016/0262199 A1    Sep. 8, 2016

(30) Foreign Application Priority Data

Mar. 5, 2015 (IN) .......................... 1148/CHE/2014

(51) Int. Cl.
*H04W 4/70* (2018.01)
*H04W 8/00* (2009.01)
(Continued)

(52) U.S. Cl.
CPC ............... *H04W 4/70* (2018.02); *H04W 4/80* (2018.02); *H04W 8/005* (2013.01); *H04W 76/14* (2018.02); *H04W 84/12* (2013.01)

(58) Field of Classification Search
CPC ..... H04W 4/005; H04W 4/008; H04W 8/005; H04W 76/023
(Continued)

(56) References Cited

U.S. PATENT DOCUMENTS

2010/0260093 A1* 10/2010 Liu ................. H04B 7/2606
370/315
2011/0280152 A1* 11/2011 Saito ................ H04W 84/20
370/254
(Continued)

FOREIGN PATENT DOCUMENTS

EP    2 838 278    2/2015
EP    2 869 658    5/2015
(Continued)

OTHER PUBLICATIONS

International Search Report dated Jan. 15, 2016 issued in counterpart application No. PCT/KR2015/010371, 9 pages.
(Continued)

*Primary Examiner* — Alpus Hsu
*Assistant Examiner* — Camquyen Thai
(74) *Attorney, Agent, or Firm* — The Farrell Law Firm, P.C.

(57) ABSTRACT

A method and system for initiating a subsequent connection is provided. The method includes sending by a first device a connection request including bootstrap information from the first device to establish an initial connection with a second device, wherein the bootstrap information comprises at least one of channel information, a power profile associated with the second device, and a role; and initiating by the first device the subsequent connection with the second device after receiving a successful connection response including bootstrap information from the second device.

12 Claims, 14 Drawing Sheets

(51) Int. Cl.
*H04W 76/14* (2018.01)
*H04W 4/80* (2018.01)
*H04W 84/12* (2009.01)

(58) Field of Classification Search
USPC .................................................. 370/255, 338
See application file for complete search history.

(56) References Cited

U.S. PATENT DOCUMENTS

| | | | |
|---|---|---|---|
| 2012/0047558 A1* | 2/2012 | Sundaram | H04L 63/0869 726/3 |
| 2012/0158981 A1* | 6/2012 | Desai | H04L 67/1093 709/230 |
| 2012/0166671 A1* | 6/2012 | Qi | H04L 45/64 709/236 |
| 2012/0239755 A1* | 9/2012 | Filgueiras | H04W 84/18 709/206 |
| 2013/0034023 A1* | 2/2013 | Jung | H04L 67/104 370/255 |
| 2013/0148545 A1* | 6/2013 | Jung | H04W 48/16 370/255 |
| 2013/0223341 A1* | 8/2013 | Kim | H04W 4/005 370/328 |
| 2014/0068023 A1* | 3/2014 | Arickan | H04L 61/2015 709/220 |
| 2014/0089478 A1* | 3/2014 | Seed | H04W 4/001 709/222 |
| 2014/0146745 A1* | 5/2014 | Huang | H04L 63/20 370/328 |
| 2014/0177613 A1* | 6/2014 | Baker | H04W 84/12 370/338 |
| 2014/0189172 A1* | 7/2014 | Sadeghi | G06F 13/385 710/105 |
| 2014/0200740 A1* | 7/2014 | Lavi | G07C 5/008 701/2 |
| 2014/0233546 A1 | 8/2014 | Vallabhu et al. | |
| 2014/0269658 A1* | 9/2014 | Sadasivam | H04W 72/0406 370/338 |
| 2014/0320910 A1 | 10/2014 | Shimazaki et al. | |
| 2014/0334464 A1* | 11/2014 | Qi | H04W 4/08 370/338 |
| 2014/0337544 A1* | 11/2014 | Huang | G06F 13/385 710/63 |
| 2014/0351479 A1* | 11/2014 | Lee | H04W 76/14 710/303 |
| 2015/0105023 A1* | 4/2015 | Jung | H04W 52/0241 455/41.2 |
| 2015/0117340 A1* | 4/2015 | Kawakami | H04W 76/023 370/329 |
| 2015/0245393 A1* | 8/2015 | Lee | H04W 8/005 370/338 |
| 2016/0142974 A1* | 5/2016 | Lindoff | H04B 1/40 370/311 |

FOREIGN PATENT DOCUMENTS

| | | |
|---|---|---|
| WO | WO 2014/033199 | 3/2014 |
| WO | WO 2014/051399 | 4/2014 |
| WO | WO 2014/142415 | 9/2014 |

OTHER PUBLICATIONS

European Search Report dated Oct. 23, 2017 issued in counterpart application No. 15884082.7-1870, 8 pages.

* cited by examiner

METHOD AND APPARATUS FOR ESTABLISHING A CONNECTION BETWEEN DEVICES

PRIORITY

This application claims priority under 35 U.S.C. § 119(a) to Indian Patent Application Serial No. 1148/CHE/2014, filed on Mar. 5, 2015 in the Indian Intellectual Property Office, the entire content of which is incorporated herein by reference.

BACKGROUND

1. Field of the Invention

The present invention relates generally to Wireless Fidelity (Wi-Fi) Direct systems, and more particularly, to a mechanism for establishing a connection between devices.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Wireless-Fidelity (Wi-Fi) Direct allows two devices to connect directly without an access point. The Wi-Fi Direct is a standard defined by the Wi-Fi Alliance. The Wi-Fi Alliance also defined the Application Service Platform (ASP) standard which defines the framework or platform which exposes certain Application Program Interfaces (APIs) to an application which allows the application easy access to some of the fundamental aspects of peer to peer (P2P) connectivity. The Wi-Fi Direct specification defines an architecture, protocols, and functionality for interoperability of the Wi-Fi Direct Services (WFDS) for establishing a session.

Generally, the ASP is a software service or a library that implements common functions needed by all applications and services conforming to a WFDS specification. However, the ASP enables or creates a session which is a logical link between two ASP enabled peers to enable streamlined and structured communication between them. The WFDS enabled system has multiple ASP sessions between two or more devices requiring the WFDS functionalities.

In existing systems, the Wi-Fi Direct systems defined the device and the service discovery mechanisms to search for the devices in the vicinity and the services supported by the devices. The Wi-Fi Direct systems enable the exchange of a Media Access Control (MAC) address to trigger the Wi-Fi Direct connectivity automatically. The connection mechanism follows the standard set of procedures for initiating a connection, which is considered time consuming and unnecessary at times. The current Wi-Fi Direct standard fundamentally lacks the clear and easy connection setup when the devices use Near Field Communication (NFC) as an out of band mechanism. Further, the Wi-Fi Direct connection experience is non-intuitive and the connection procedures takes time, which degrades the user experience.

SUMMARY

The present invention has been made to provide at least the advantages described below.

Accordingly, an aspect of the present invention is to provide a method and an apparatus for establishing a connection based on bootstrap information communicated during an initial connection.

Another aspect of the present invention is to provide a method and an apparatus for establishing a subsequent connection between a first device and a second device based on bootstrap information negotiated between devices during an initial connection.

Another aspect of the present invention is to provide a method and an apparatus for sending an initial connection request including bootstrap information by a first device to establish the initial connection with a second device.

In accordance with an aspect of the present invention, a method of initiating a subsequent implemented in a device is provided. The method includes sending by a first device a connection request including bootstrap information from the first device to establish an initial connection with a second device, wherein the bootstrap information includes at least one of channel information, a power profile associated with the second device, and a role, and initiating by the first device the subsequent connection with the second device after receiving a successful connection response including bootstrap information from the second device.

In accordance with another aspect of the present invention, a system for initiating a subsequent connection is provided. The system includes a first device configured to send a connection request including bootstrap information of the first device to establish an initial connection with the second device, wherein the bootstrap information includes at least one of channel information, a power profile associated with the second device, and a role, wherein the second device is configured to send a successful connection response including bootstrap information of the second device to the first device in response to receiving the connection request, wherein the first device is further configured to initiate the subsequent connection with the second device after receiving the successful connection response.

In accordance with another aspect of the present invention, a device for initiating a subsequent connection is provided. The device is configured to send a connection request including bootstrap information to establish an initial connection with another device, wherein the bootstrap information includes at least one of channel information, a power profile associated with the another device, and a role, receive a successful connection response including bootstrap information from the another device, and initiate the subsequent connection with the another device after receiving the successful connection response.

In accordance with another aspect of the present invention, a device for receiving a subsequent connection request is provided. The device is configured to receive a connection request including bootstrap information from another device to establish an initial connection with the device, wherein the bootstrap information includes at least one of channel information, a power profile, and a role; send a successful connection response including bootstrap information to the another device in response to receiving the connection request; and receive the subsequent connection request from the another device to initiate a subsequent connection between the device and the another device.

In accordance with another aspect of the present invention, a non-transitory computer readable storage medium, having recorded thereon a computer program for executing a method is provided. The method includes sending by a first device a connection request including bootstrap information to establish an initial connection with a second device, wherein the bootstrap information includes at least one of channel information, a power profile associated with the second device, and a role; and initiating a subsequent connection by the first device with the second device after receiving a successful connection response including bootstrap information from the second device.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Figure 1:
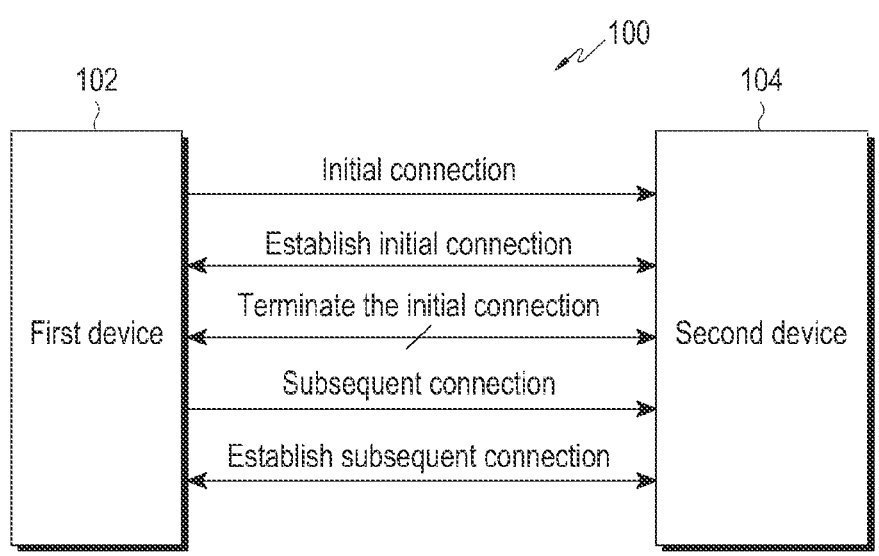
FIG. 1 is a block diagram of a system for establishing a subsequent connection between a first device and a second device, according to an embodiment of the present invention.

The embodiments of the present invention herein and the various features and advantageous details thereof are described more fully with reference to the non-limiting embodiments that are illustrated in the accompanying drawings and detailed in the following description. Descriptions of well-known components and processing techniques are omitted so as to not unnecessarily obscure the embodiments of the present invention herein. Also, the various embodiments of the present invention described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments of the present invention herein can be practiced and to further enable those skilled in the art to practice the embodiments herein. Accordingly, the examples should not be construed as limiting the scope of the present invention.

The embodiments of the present invention herein achieve a method and system for initiating a subsequent connection between a first device and a second device sending a connection request with bootstrap information by the first device to establish an initial connection with the second device.

In an embodiment of the present invention, the bootstrap information includes channel information, a power profile associated with the second device, or a role.

Further, the method includes terminating the initial connection by the first device with the second device. Furthermore, the method includes initiating a subsequent connection by sending a subsequent connection request by the first device to the second device. Further, the method includes establishing the subsequent connection by the first device with the second device after receiving a successful connection response with bootstrap information from the second device.

In an embodiment of the present invention, the bootstrap information received from the second device can be the same as the bootstrap information sent by the first device.

In an embodiment of the present invention, the bootstrap information received from the second device can be different from the bootstrap information sent by the first device.

In an embodiment of the present invention, the subsequent connection is an immediate subsequent connection following the initial connection.

In an embodiment of the present invention, the subsequent connection can be a third connection after the first connection.

In an embodiment of the present invention, the method includes sending a discovery request by the first device to the second device using the channel information received during the initial connection with the second device. The discovery request is sent by considering the power profile associated with the second device. Further, the method includes receiving a discovery response by the first device from the second device with a role of the second device in the bootstrap information. Further, the method includes initiating the subsequent connection by the first device with the second device by sending a provision discovery request using the channel information. Further, the method includes establishing the subsequent connection by the first device with the second device in response to receiving a provision discovery response from the second device.

In an embodiment of the present invention, the method includes sending a subsequent connection request by the first device to the second device using the channel information received during the initial connection with the second device. Further, the method includes triggering a persistent group created during the initial connection between the first device and the second device. Further, the method includes receiving a successful subsequent connection response by the first device from the second device. Further, the method includes establishing the subsequent connection by the first device with the second device by participating in the persistent group based on the role of the first device.

In an embodiment of the present invention, the method includes sending the subsequent connection request to initiate an association process by the first device to the second device based on the channel information, the role, Autonomous Group Owner (AutoGO) information, an Internet Protocol (IP) address sent in the bootstrap information during the initial connection.

In an embodiment of the present invention, the channel information includes an operating channel or a listen channel. In an embodiment of the present invention, the role is a Group Owner (GO) role.

Further, the method includes receiving a successful subsequent connection response by the first device from the second device. Further, the method includes establishing the subsequent connection by the first device with the second device based on the AutoGO information sent in the bootstrap information during the initial connection.

In an embodiment of the present invention, a first device 102 initiates an initial connection with a second device 104 as illustrated in FIG. 1 described below. During the initial connection procedure, the first device 102 and the second device 104 negotiate bootstrapping information.

In an embodiment of the present invention, NFC can be used to set the channel information.

In an embodiment of the present invention, any other out of band mechanism can be used to set the channel information.

In conventional Wi-Fi Direct systems, when a user turns on the Wi-Fi Direct device then the device searches for nearby devices. In some instances, the device can search for nearby devices very quickly and in other instances the device takes more time to search for nearby devices, leading to a degradation of user experience.

Unlike conventional systems, the proposed method and system defines a new state machine for one or more secondary devices. The secondary devices enter into a listen phase for a specified amount of time. The secondary device can enter into a sleep mode periodically and will not enter into the search phase unless triggered by the user.

Unlike conventional systems, the proposed method and system optimizes the device discovery and connection procedures for a Wi-Fi Direct connection. Further, the proposed method and system improves the connection experience for the user and the devices associated with the user.

The terms such as "first," and "second," are used merely to describe an embodiment of the present invention, but do not limit the scope of the present invention.

FIG. 1 is a block diagram of a system 100 for establishing a subsequent connection between a first device and a second device, according to an embodiment of the present invention. The system 100 includes a first device 102 and a second device 104.

Referring to FIG. 1, the first device 102 can include appropriate interfaces to directly or indirectly communicate with the second device 104 and with various other devices over a network.

The first device 102 sends a connection request with bootstrap information to establish an initial connection with the second device 104. In an embodiment of the present invention, the bootstrap information includes channel information, a power profile associated with the second device 104, or a role. In an embodiment of the present invention, the channel information includes a listen channel or an operating channel. In an embodiment of the present invention, the role is a Group Owner (GO) role. In an embodiment of the present invention, the role can include, for example but is not limited to, a role of the first device 102 and a role of the second device 104.

After receiving the connection request, the second device 104 sends a successful connection response with bootstrap information to the first device 102. The first device 102 stores the bootstrap information received in the successful connection response from the second device 104. Further, the first device 102 establishes the initial connection with the second device 104.

The first device 102 terminates the initial connection with the second device 104. Further, the first device 102 initiates the subsequent connection with the second device 104. In an example, the subsequent connection can immediately follow the first connection (e.g. the initial connection). In another example, the subsequent connection can be a third connection after the first connection. Furthermore, the first device 102 establishes the subsequent connection with the second device 104 based on the bootstrap information received in the successful connection response from the second device 104 during the initial connection.

In an embodiment of the present invention, the first device 102 sends a discovery request to the second device 104 using the channel information received during the initial connection with the second device 104. The discovery request is sent by considering the power profile associated with the second device 104. Further, the first device 102 receives a discovery response from the second device 104 with a role of the second device in the bootstrap information. Further, the first device 102 initiates the subsequent connection with the second device 104 by sending a provision discovery request using the channel information. Further, the first device 102 establishes the subsequent connection with the second device 104 after receiving a provision discovery response to the provision discovery request.

In an embodiment of the present invention, the first device 102 sends a subsequent connection request to the second device 104 using the channel information received during the initial connection with the second device 104. Further, the first device 102 triggers a persistent group created during the initial connection. Further, the first device 102 receives a successful connection response from the second device 104. Further, the first device 102 establishes the subsequent connection with the second device 104 by participating in the persistent group based on the role of the first device 102.

In an embodiment of the present invention, the first device 102 sends a subsequent connection request to initiate an association process to the second device 104 based on the channel information, the AutoGO information, the role, an IP address sent in the bootstrap information during the initial connection. In an embodiment of the present invention, the channel information includes an operating channel or a listen channel. In an embodiment of the present invention, the role is a GO role. Further, the first device 102 receives a successful subsequent connection response from the second device 104 to the subsequent connection request. Further, the first device 102 establishes the subsequent connection based on the AutoGO information received in the bootstrap information during the initial connection.

FIG. 1 shows a limited overview of the system 100 but, it is to be understood that other embodiments are not limited thereto. The system 100 can include any number of electronic devices along with other hardware or software components communicating with each other. For example, the component can be, but is not limited to, a process running in a controller or processor, an object, an executable process, a thread of execution, a program, or a computer. By way of illustration, both an application running on a device and the device itself can be a component.

Figure 2:
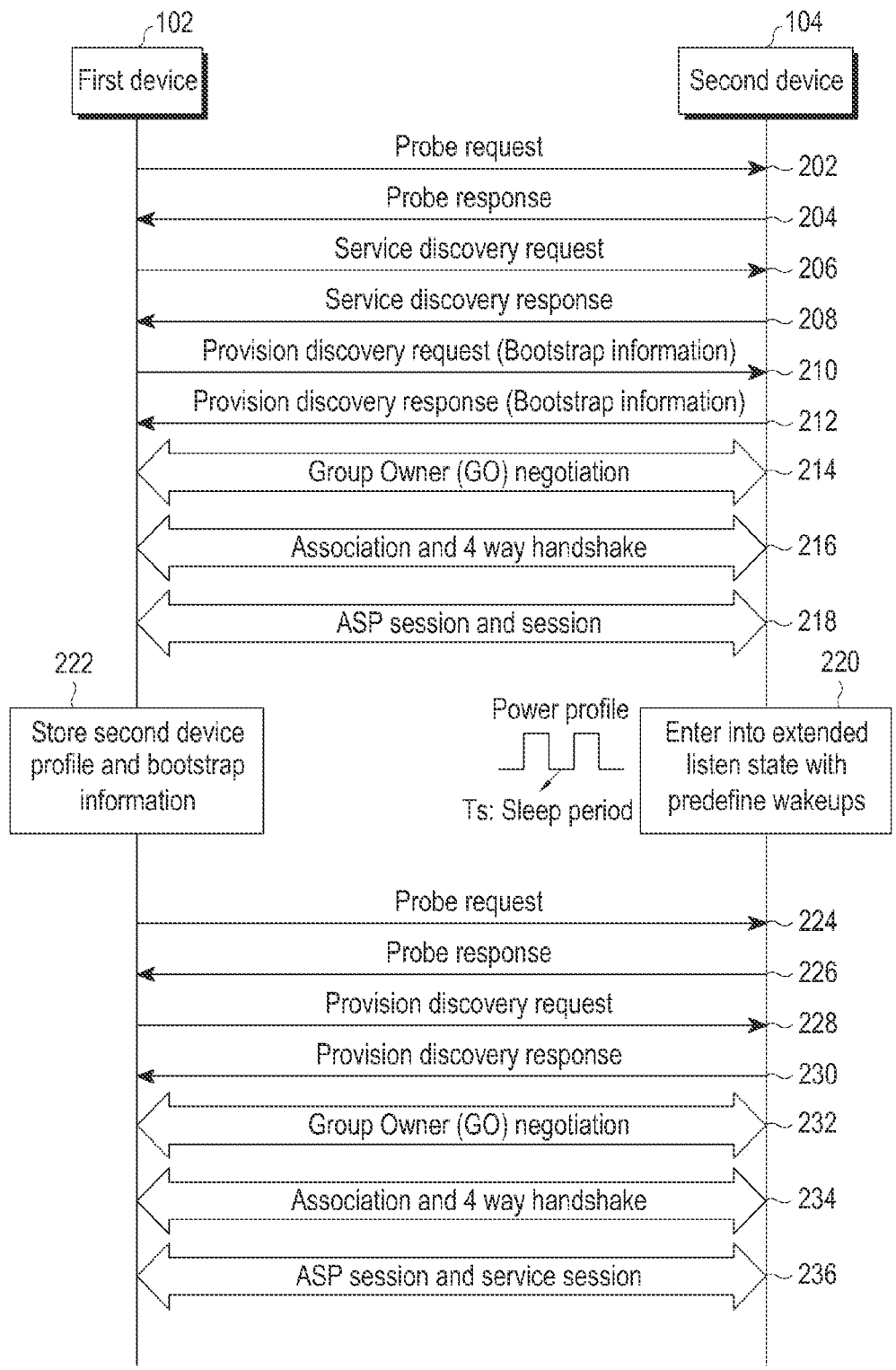
FIG. 2 is a flow diagram for establishing a subsequent connection between a first device and a second device, according to an embodiment of the present invention.

FIG. 2 is a flow diagram for establishing the subsequent connection between the first device 102 and the second device 104, according to an embodiment of the present invention. The signaling sequence depicts communication between the first device 102 and the second device 104.

Referring to FIG. 2, the first device 102 and the second device 104 initiate the connection procedures as defined in an existing Peer-to-Peer (P2P) specification standard. The first device 102 and the second device 104 search for each other using the social channels 1, 6, and 11; and the first device 102 and the second device 104 initiate hopping between the social channels.

After the first device 102 discovers the second device 104, in step 202, the first device 102 sends a probe request to the second device 104. In step 204, the second device 104 sends a probe response to the first device 102 after receiving the probe request.

In step 206, the first device 102 sends a service discovery request to the second device 104. After receiving the service discovery request, in step 208, the second device 104 sends a service discovery response to the first device 102.

In step 210, the first device 102 sends the connection request with the bootstrap information to the second device 104. In an embodiment of the present invention, the connection request is a provision discovery request. In an embodiment of the present invention, the bootstrap information includes, for example but is not limited to, the role, the listen channel, the power profile associated with the second device 104 (i.e., the power profile identifies the sleeping pattern for the second device 104).

After receiving the connection request, in step 212, the second device 104 sends a successful connection response including bootstrap information to the first device 102. In an embodiment of the present invention, the successful connection response is a provision discovery response. In an embodiment of the present invention, the bootstrap information received from the second device 104 can be the same as the bootstrap information sent by the first device 102.

In an embodiment of the present invention, the bootstrap information received from the second device 104 can be different from the bootstrap information sent by the first device 102.

In step 214, the GO negotiation between the first device 102 and the second device 104 is initiated as per existing P2P connection procedures.

In step 216, an association and 4-way handshake between the first device 102 and the second device 104 will be accomplished as per the existing P2P specification standard.

In step 218, an Application Session Protocol (ASP) session and a session is established between the first device 102 and the second device 104 as per the existing P2P specification standard.

After terminating the initial connection by the first device 102 with the second device 104, in step 220, the second device 104 enters into a listen state. In the listen state, the second device 104 may do a periodic wake up and a periodic sleep depending on the power profile in the bootstrap information received or defined by the second device 104 during the initial connection. The second device 104 listens to the listen channel identified in the bootstrap information, which was negotiated with the first device 102 during the initial connection.

In step 222, the first device 102 stores the role of the second device 104 and the bootstrap information received in the successful connection response from the second device 104. In this case, when the first device 102 initiates the subsequent connection with the second device 104, in step 224, the first device 102 sends a probe request directly to the listen channel in the bootstrap information for connecting with the second device 104. In an embodiment of the present invention, the probe request is a unicast message that can be sent through Layer 2 (L2) of the Open Systems Interconnection (OSI) model (i.e., the data link layer).

In step 226, the second device 104 sends a probe response to the first device 102. In step 228, the first device 102 sends a subsequent connection request to the second device 104. In an embodiment of the present invention, the subsequent connection request is a provision discovery request. After receiving the connection request, the second device 104 sends a successful subsequent connection response to the first device 102. In an embodiment of the present invention, the successful subsequent connection response is a provision discovery response.

In step 232, GO negotiation between the first device 102 and the second device 104 is initiated. In an embodiment of the present invention, after the GO negotiation between the first device 102 and the second device 104, the operating channel between the first device 102 and the second device 104 can be altered.

In step 234, the association and the 4-way handshake between the first device 102 and the second device 104 is accomplished as per the existing P2P specification standard.

In step 236, an ASP session and a service session can be established between the first device 102 and the second device 104 as per the existing P2P specification standard. Unlike conventional systems, the connection process between the first device 102 and the second device can be improved and can consume a minimum amount of time for establishing a subsequent connection between the first device 102 and the second device 104 thus, increasing the overall user experience.

Figure 3:
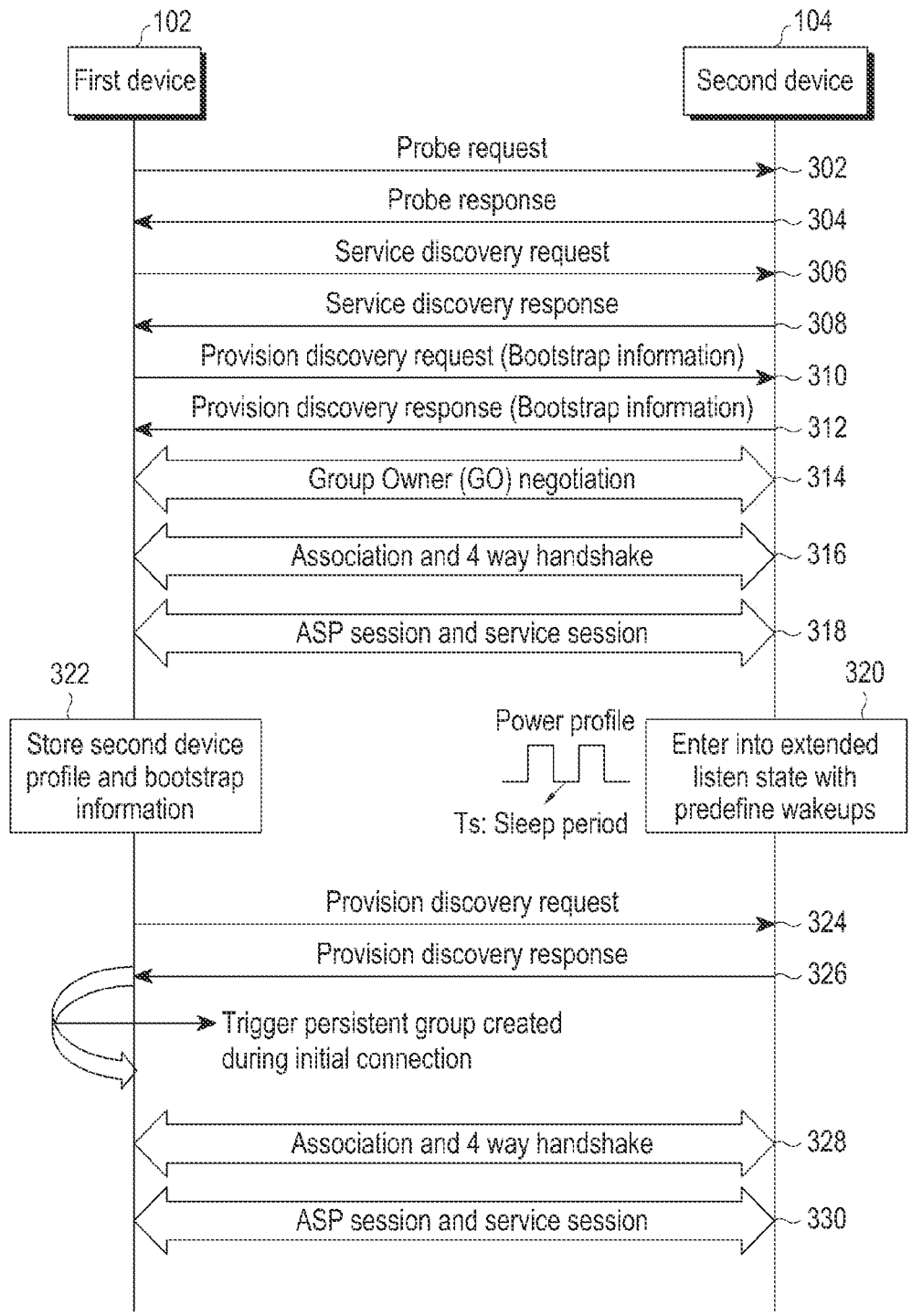
FIG. 3 is a flow diagram for establishing a subsequent connection between a first device and a second device, according to an embodiment of the present invention.

FIG. 3 is a flow diagram for establishing a subsequent connection between the first device 102 and the second device 104, according to an embodiment of the present invention.

Referring to FIG. 3, steps 302 to 322 are the same as steps 202 to 222 of FIG. 2. Accordingly, a repetitive description of steps 302 to 322 is omitted.

In step 324, the first device 102 sends the subsequent connection request to the second device 104. In an embodiment of the present invention, the subsequent connection request is the provision discovery request. After receiving the connection request, in step 326, the second device 104 sends the successful subsequent connection response to the first device 102. In an embodiment of the present invention, the successful subsequent connection response is the provision discovery response.

After receiving the successful subsequent connection response, the first device 102 triggers the persistent group created during the initial connection. Further, the first device 102 and the second device 104 utilize the persistent group created during the initial connection. Further, the first device 102 and the second device 104 are mapped to the service session with the persistent group allowing the first device 102 and the second device 104 to establish the subsequent connection in a minimum amount of time.

In an embodiment of the present invention, the first device 102 stores the bootstrap information. After completing the bootstrapping connection, if the first device 102 triggers the subsequent connection with the second device 104 then, the first device 102 directly sends the subsequent connection request (i.e., provision discovery request) representing the request to trigger the persistent group created during the initial connection. After receiving the successful subsequent connection response, the first device 102 and the second device 104 directly start the association process, in step 328, which is followed by the ASP session and the service session, in step 330.

Figure 4:
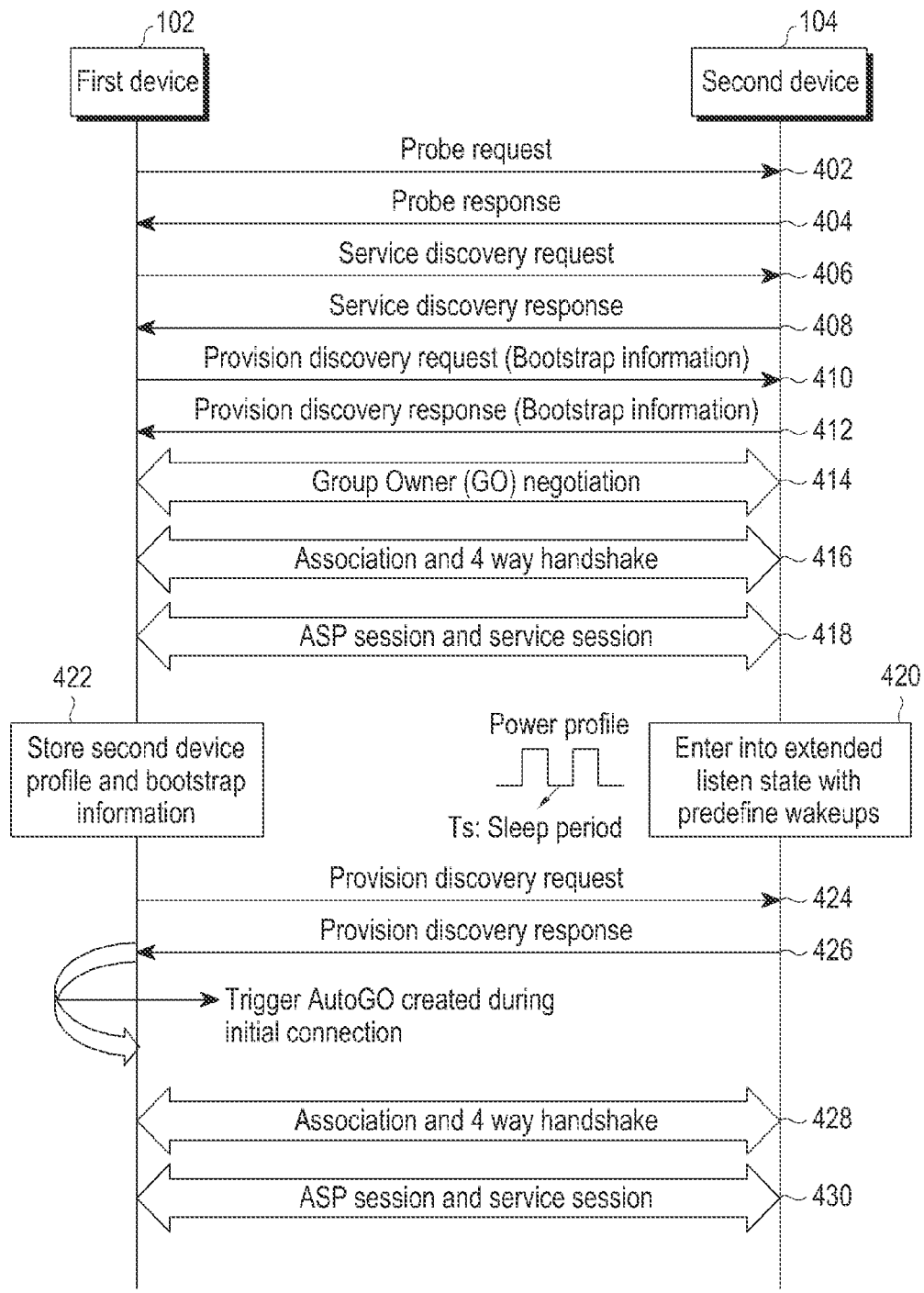
FIG. 4 is a flow diagram for establishing a subsequent connection between a first device and a second device, according to an embodiment of the present invention.

FIG. 4 illustrates another sequence diagram for establishing the subsequent connection between the first device 102 and the second device 104, according to embodiments as disclosed herein.

Referring to FIG. 4, steps 402 to 422 are the same as steps 202 to 222 of FIG. 2. Accordingly, a repetitive description of steps 402 to 422 is omitted.

In step 424 in FIG. 4, the first device 102 sends the subsequent connection request to the second device 104. In an embodiment of the present invention, the subsequent connection request is the provision discovery request. During the initial or the subsequent connection, the bootstrapping information negotiates the AutoGO information for e.g., the GO role, the operating channel, the listen channel, the IP address assignment. After terminating the initial connection, the first device 102 triggers a subsequent connection with the second device 104 by sending a subsequent connection request (i.e., a provision discovery request). After receiving the subsequent connection request, the second device 104 sends a subsequent connection response (i.e., a provision discovery response) to the first device 102. The first device 102 and the second device 104 know exactly which device is the GO using the AutoGO information thus, initiating the association directly between the first device 102 and the second device 104.

Steps 426 to 430 are the same as steps 326 to 330 of FIG. 3. Accordingly, a repetitive description of steps 426 to 430 is omitted.

Figure 5A:
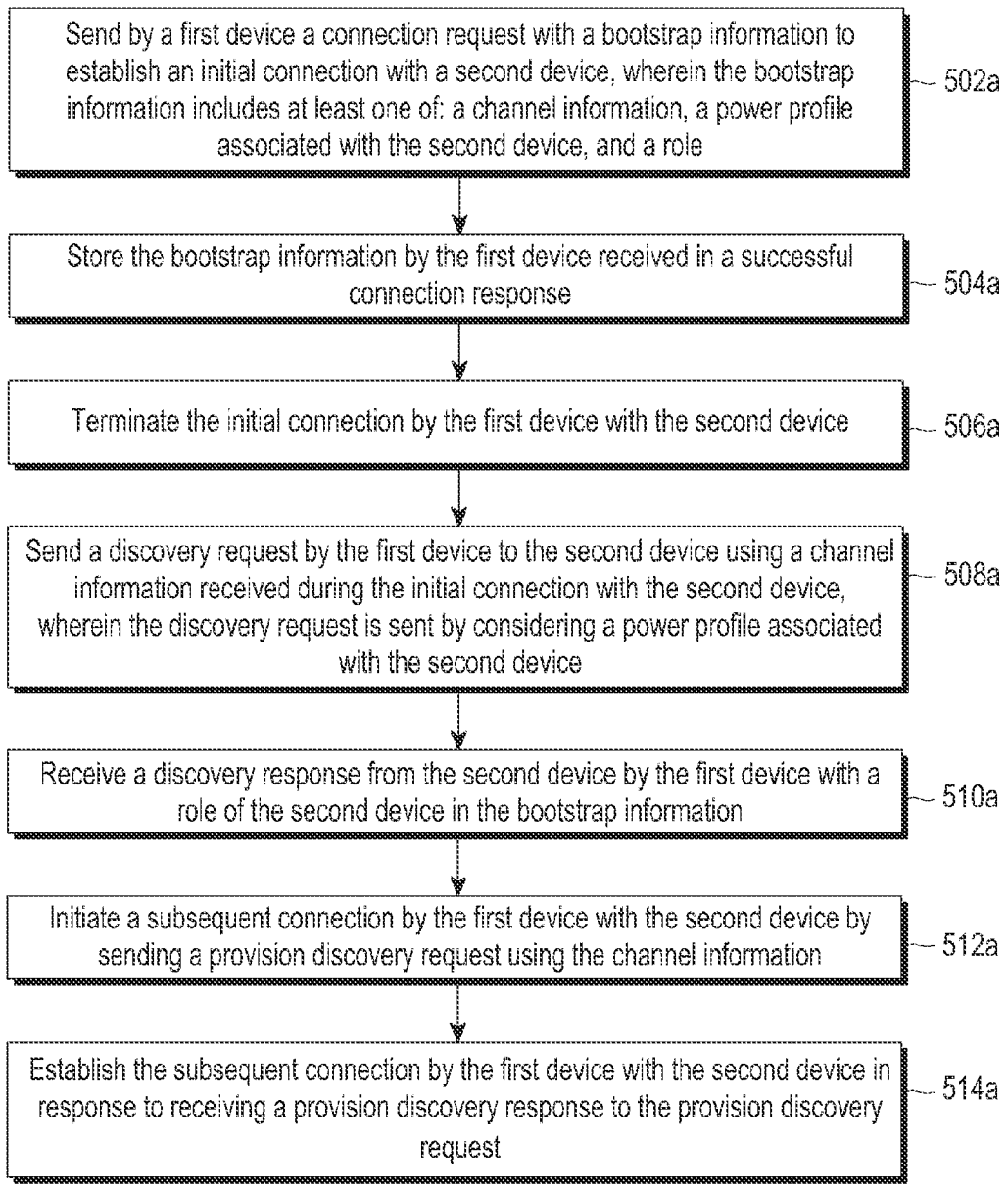
FIG. 5A is a flowchart of a method of establishing a subsequent connection between a first device and a second device, according to an embodiment of the present invention.

FIG. 5A is a flowchart of a method of establishing a subsequent connection between the first device 102 and the second device 104, according to an embodiment of the present invention.

Referring to FIG. 5A, in step 502a, the connection request with the bootstrap information is sent by the first device 102 to establish an initial connection with the second device 104. The bootstrap information includes the channel information, the power profile associated with the second device 104, or the role. In step 504a, the bootstrap information received in the successful connection response from the second device 104 is stored by the first device 102. In step 506a, the initial connection with the second device 104 is terminated by the first device 102.

In step 508a, a discovery request is sent by the first device 102 to the second device 104 using the channel information received during the initial connection with the second device 104. The discovery request is sent by considering the power profile associated with the second device 104. In step 510a, a discovery response is received from the second device 104 by the first device 102 with the role of the second device 104 in the bootstrap information.

In step 512a, a subsequent connection is initiated by the first device 102 with the second device 104 by sending the provision discovery request using the channel information. In step 514a, the subsequent connection is established by the first device 102 with the second device 104 in response to receiving the provision discovery response to the provision discovery request.

The various actions, acts, blocks, steps, and the like in the method may be performed in the order presented, in a different order or simultaneously. Further, in an embodiment of the present invention, some actions, acts, blocks, steps, and the like may be omitted, added, modified, skipped, and the like without departing from the scope and spirit of the present invention.

Figure 5B:
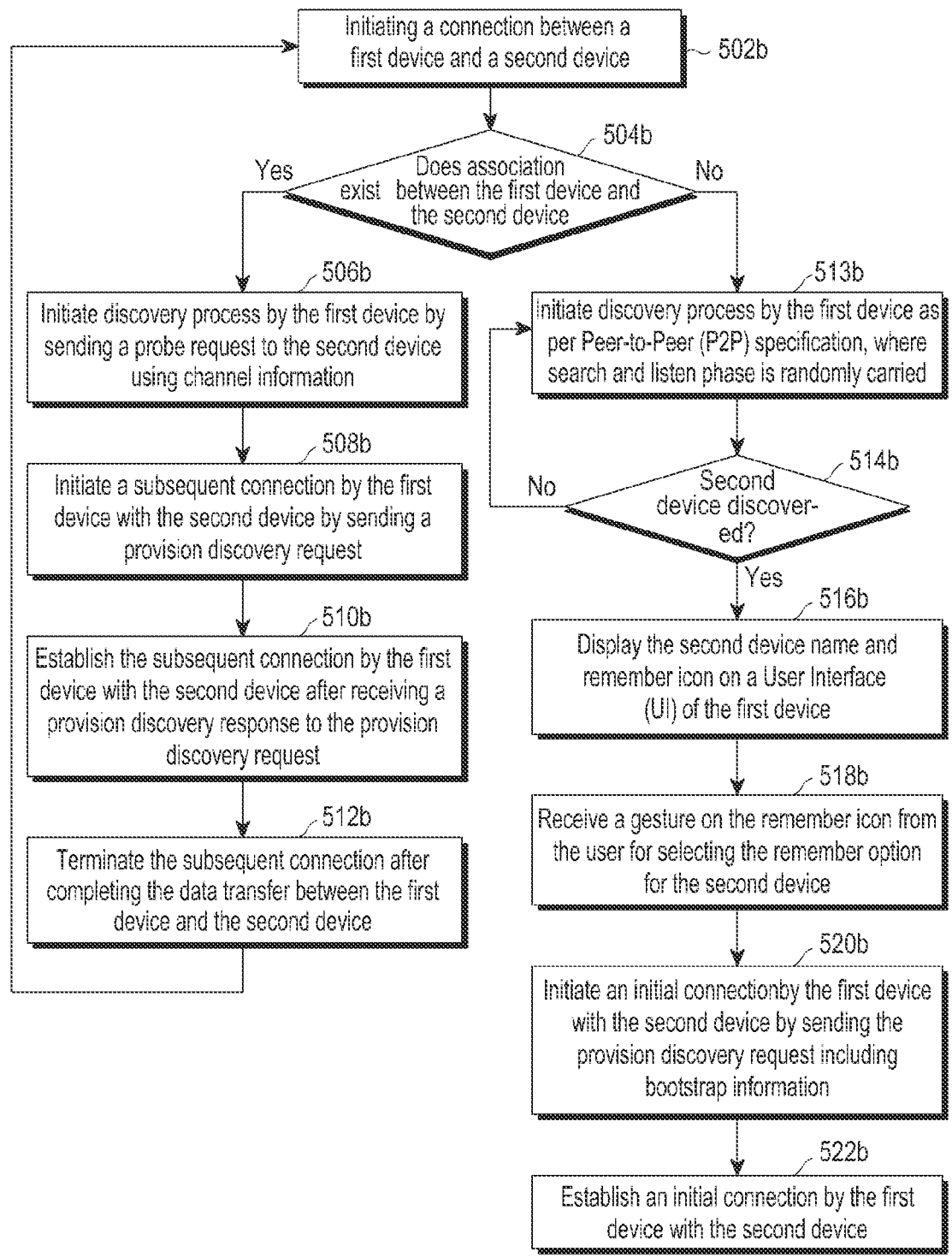
FIG. 5B is a flowchart of a method of establishing a subsequent connection by a first device with a second device, according to an embodiment of the present invention.

FIG. 5B is a flowchart of a method of establishing the subsequent connection by the first device 102 with the second device 104, according to an embodiment of the present invention.

Referring to FIG. 5B, in step 502b, a connection between the first device 102 and the second device 104 is initiated. If it is determined, in step 504b, that an association exists between the first device 102 and the second device 104 then, in step 506b, a discovery process is initiated by the first device 102 by sending a probe request to the second device 104 using the channel information. In step 508b, a subsequent connection is initiated by the first device 102 with the second device 104 by sending a provision discovery request. In step 510b, the subsequent connection is established by the first device 102 with the second device 104 after receiving a provision discovery response to the provision discovery request. In step 512b, the subsequent connection is terminated after completing the data transfer between the first device 102 and the second device 104 and the same process will be followed as described above in the case of a new connection initiated between the first device 102 and the second device 104

If it is determined, in step 504b, that an association does not exist between the first device 102 and the second device 104 then, in step 513b, a discovery process is initiated by the first device 102 as per the P2P specification standard to discover the second device 104. The search and the listen phase are randomly carried out between the first device 102 and the second device 104. If it is determined, in step 514*b*, that the second device 104 is discovered by the first device 102 then, in step 516*b*, the name of the second device 104 and a remember icon are displayed on a User Interface (UI) of the first device 102. If it is determined, in step 514*b*, that the second device 104 is not discovered then, in step 513*b*, a discovery process is initiated by the first device 102 as per the P2P specification standard. The search and the listen phase are randomly carried out between the first device 102 and the second device 104.

In step 518*b*, a gesture on the remember icon is received from the user for selecting the second device 104. In step 520*b*, an initial connection is initiated by the first device 102 with the second device 104 by sending a provision discovery request including the bootstrap information. In step 522*b*, the initial connection is established by the first device 102 with the second device 104. And then, the initial connection can be terminated after completing the data transfer between the first device 102 and the second device 104 and the same process will be followed as described above from step 502 in the case of a new connection initiated between the first device 102 and the second device 104.

The various actions, acts, blocks, steps, and the like in the method may be performed in the order presented, in a different order or simultaneously. Further, in an embodiment of the present invention, some actions, acts, blocks, steps, and the like may be omitted, added, modified, skipped, and the like without departing from the scope and spirit of the present invention.

Figure 6A:
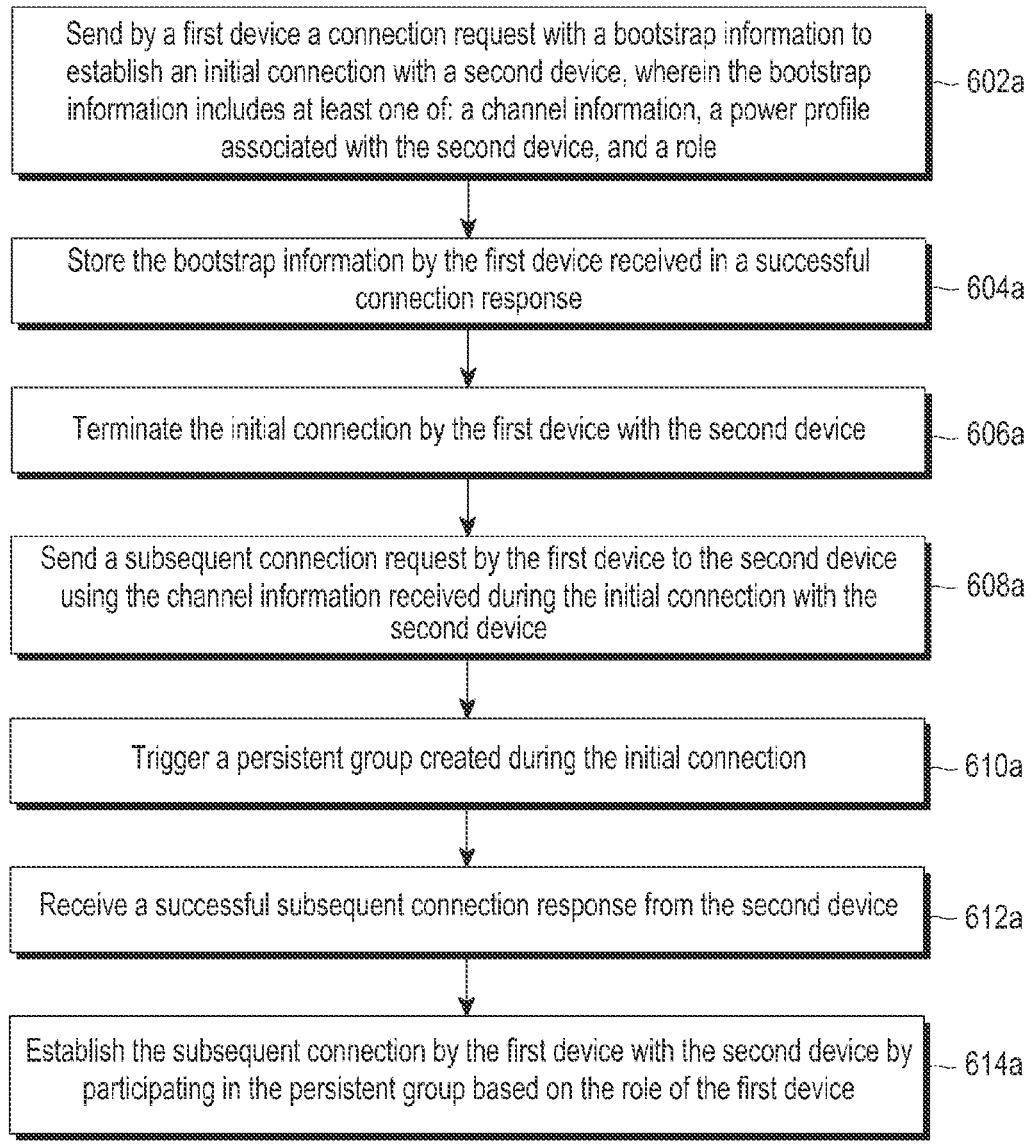
FIG. 6A is a flowchart of a method of establishing a subsequent connection between a first device and a second device, according to an embodiment of the present invention.

FIG. 6A is a flowchart of a method of establishing a subsequent connection between the first device 102 and the second device 104, according to an embodiment of the present invention.

Referring to FIG. 6A, in step 602*a*, the first device 102 sends a connection request with bootstrap information to establish an initial connection with the second device 104. The bootstrap information includes channel information, a power profile associated with the second device 104, or a role. In step 604*a*, the first device 102 stores the bootstrap information received in the successful connection response from the second device 104. In step 606*a*, the initial connection with the second device 104 is terminated by the first device 102.

In step 608*a*, a subsequent connection request is sent by the first device 102 to the second device 104 using the channel information received during the initial connection with the second device 104. In step 610*a*, the persistent group created during the initial connection is triggered.

In step 612*a*, a successful subsequent connection response is received by the first device 102 from the second device 104. In step 614*a*, a subsequent connection is established by the first device 102 with the second device 104 by participating in the persistent group based on the role of the first device 102.

The various actions, acts, blocks, steps, and the like in the method may be performed in the order presented, in a different order or simultaneously. Further, in an embodiment of the present invention, some actions, acts, blocks, steps, and the like may be omitted, added, modified, skipped, and the like without departing from the scope and spirit of the present invention.

Figure 6B:
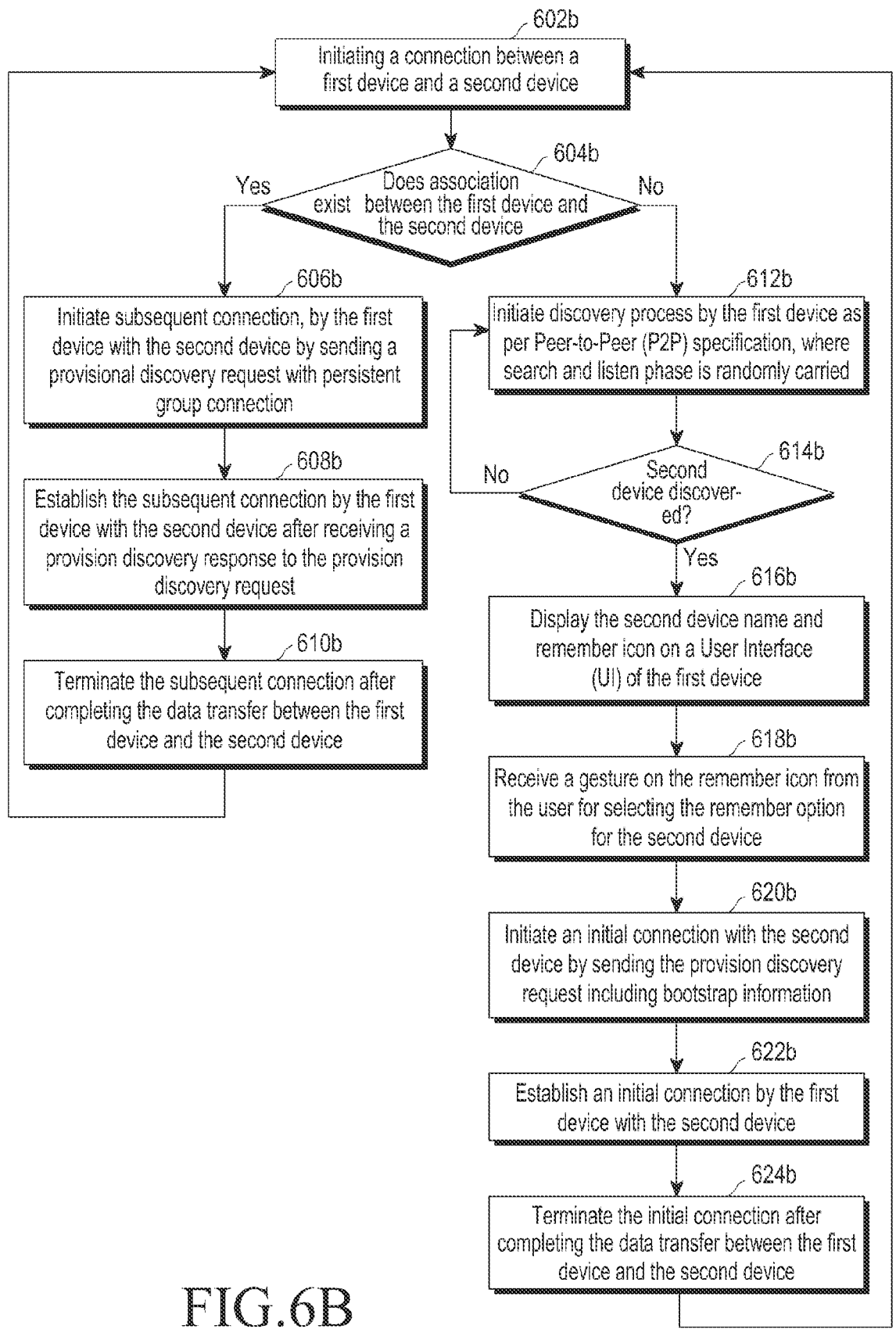
FIG. 6B is a flowchart of a method of establishing a subsequent connection by a first device with a second device, according to an embodiment of the present invention.

FIG. 6B is a flowchart of a method of establishing a subsequent connection by the first device 102 with the second device 104, according to an embodiment of the present invention.

Referring to FIG. 6B, in step 602*b*, a connection is initiated between the first device 102 and the second device 104. If it is determined, in step 604*b*, that an association exists between the first device 102 and the second device 104 then, in step 606*b*, a subsequent connection is initiated by the first device 102 with the second device 104 by sending a provisional discovery request with the persistent group connection created during the initial connection. At step 608*b*, the method includes establishing the subsequent connection by the first device 102 with the second device 104 after receiving the provision discovery response to the provision discovery request. At step 610*b*, the method includes terminating the subsequent connection after completing the data transfer between the first device 102 and the second device 104 and the same process will be followed as described above from the step 602*b* in case of a new connection initiated between the first device 102 and the second device 104.

If it is determined, in step 604*b*, that the association does not exist between the first device 102 and the second device 104 then, in step 612*b*, a discovery process is initiated by the first device 102 as per the P2P specification standard to discover the second device 104. In an embodiment of the present invention, the search and listen phase are randomly carried out between the first device 102 and the second device 104. If it is determined, in step 614*b*, that the second device 104 is discovered by the first device 102 then, in step 616*b*, the name of the second device 104 and a remember icon is displayed on the UI of the first device 102. If it is determined, in step 614*b*, that the second device 104 is not discovered then, in step 612*b*, the discovery process is initiated by the first device 102 as per the P2P specification standard. The search and the listen phase are randomly carried out between the first device 102 and the second device 104.

In step 618*b*, a gesture on the remember icon is received from the user for selecting the second device 104. In step 620*b*, an initial connection is initiated by the first device 102 with the second device 104 by sending a provision discovery request including the bootstrap information. In step 622*b*, the initial connection is established by the first device 102 with the second device 104. In step 624*b*, the initial connection is terminated after completing the data transfer between the first device 102 and the second device 104 and the same process will be followed as described above from step 602*b* in the case of a new connection initiated between the first device 102 and the second device 104.

The various actions, acts, blocks, steps, and the like in the method may be performed in the order presented, in a different order or simultaneously. Further, in an embodiment of the present invention, some actions, acts, blocks, steps, and the like may be omitted, added, modified, skipped, and the like without departing from the scope and spirit of the present invention.

Figure 7A:
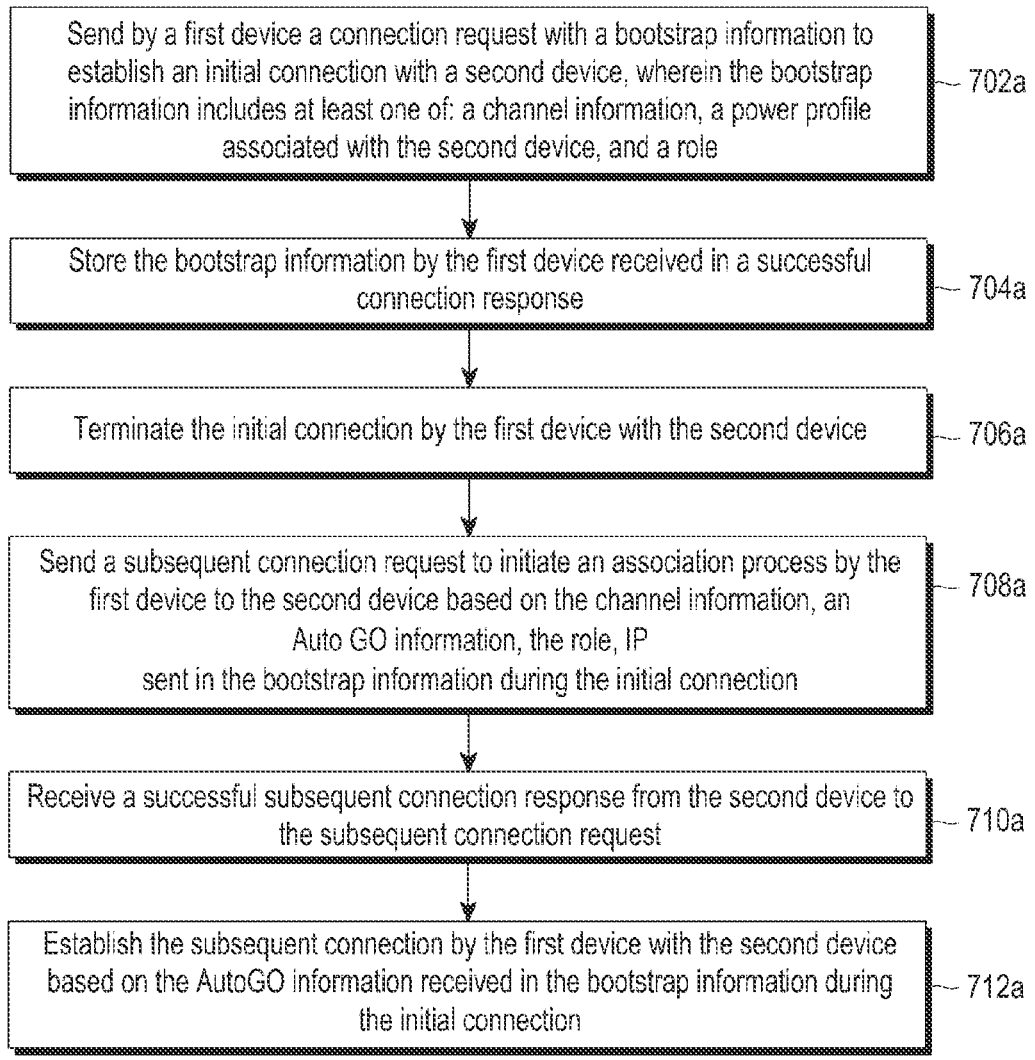
FIG. 7A is a flowchart of a method of establishing a subsequent connection between a first device and a second device, according to an embodiment of the present invention.

FIG. 7A is a flowchart of a method of establishing a subsequent connection between the first device 102 and the second device 104, according to an embodiment of the present invention.

Referring to FIG. 7*a*, in step 702*a*, a connection request is sent with the bootstrap information by the first device 102 to establish an initial connection with the second device 104. The bootstrap information includes channel information, a power profile associated with the second device 104, or a role. In step 704*a*, the bootstrap information received by the first device 102 in the successful connection response from the second device 104 is stored. In step 706*a*, the initial connection is terminated by the first device 102 with the second device 104.

In step 708a, a subsequent connection request to initiate the association process is sent by the first device 102 to the second device 104 based on the channel information, the role, the AutoGO information, the IP address sent in the bootstrap information during the initial connection. In an embodiment of the present invention, the channel information is the operating channel and the role is the GO role. In step 710a, a successful subsequent connection response to the subsequent connection request is received from the second device 104. In step 712a, a subsequent connection is established by the first device 102 with the second device 104 based on the AutoGO information received in the bootstrap information during the initial connection.

The various actions, acts, blocks, steps, and the like in the method may be performed in the order presented, in a different order or simultaneously. Further, in an embodiment of the present invention, some actions, acts, blocks, steps, and the like may be omitted, added, modified, skipped, and the like without departing from the scope and spirit of the invention.

Figure 7B:
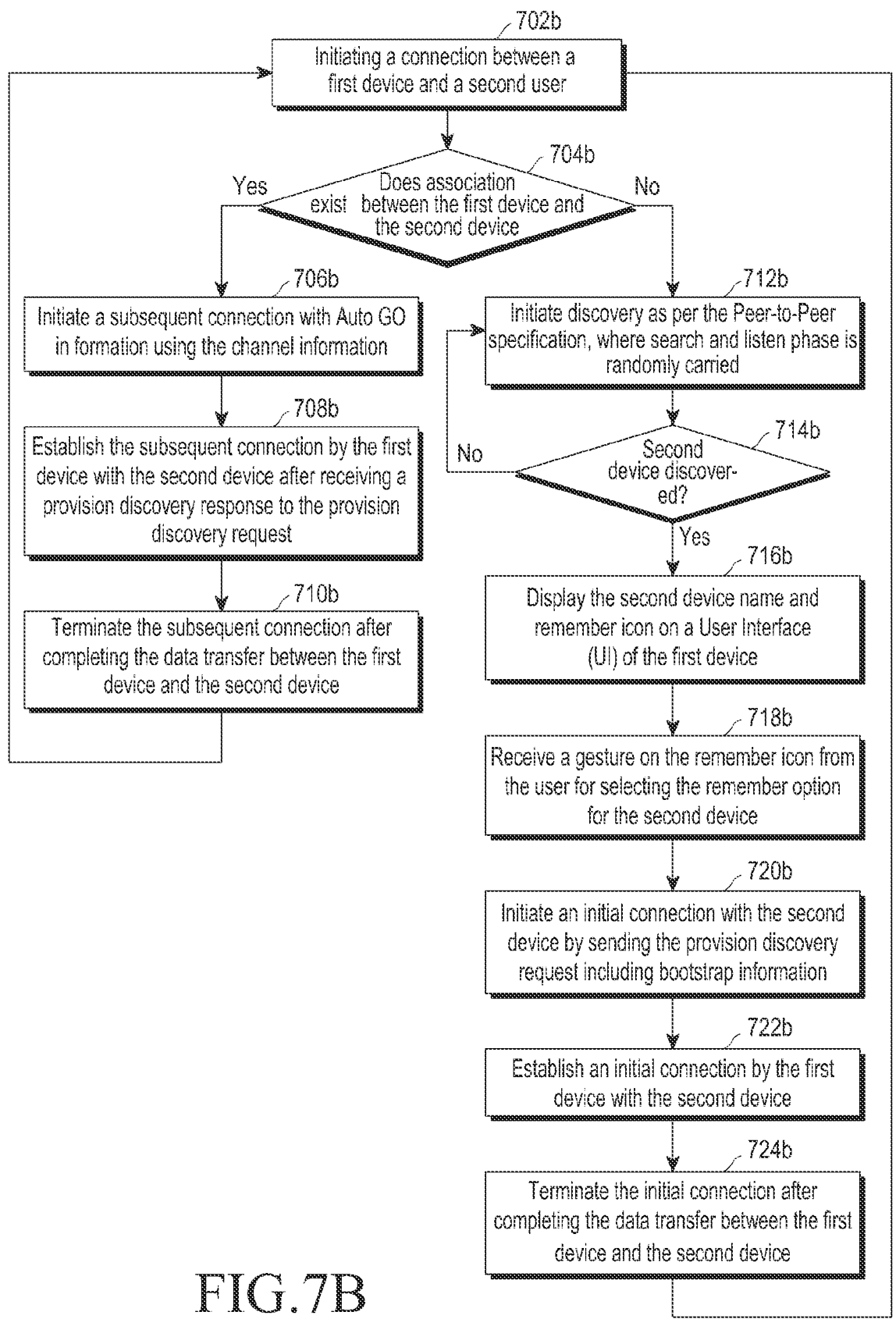
FIG. 7B is a flowchart of a method of establishing a subsequent connection by a first device with a second device, according to an embodiment of the present invention.

FIG. 7B is a flowchart of a method for establishing a subsequent connection by the first device 102 with the second device 104, according to an embodiment of the present invention.

Referring to FIG. 7A, in step 702b, a connection between the first device 102 and the second device 104 is initiated. If it is determined, in step 704b, that an association exists between the first device 102 and the second device 104 then, in step 706b, a subsequent connection is initiated directly by the first device 102 with the second device 104 by sending a provisional discovery request using the AutoGO information and the channel information received during the initial connection. In step 708b, the subsequent connection is established by the first device 102 with the second device 104 after receiving a provision discovery response to a provision discovery request. In step 710b, the subsequent connection is terminated after completing the data transfer between the first device 102 and the second device 104.

If it is determined, in step 704b, that the association does not exist between the first device 102 and the second device 104 then, in step 712b, a discovery process is initiated by the first device 102 as per the P2P specification standard to discover the second device 104. In an embodiment of the present invention, the search phase and listen phase are randomly carried out between the first device 102 and the second device 104. If it is determined, in step 714b, that the second device 104 is discovered by the first device 102 then, in step 716b, the name of the second device 104 and a remember icon on the UI of the first device 102 are displayed. If it is determined, in step 714b, that the second device 104 is not discovered then, in step 712b, a discovery process is initiated by the first device 102 as per the P2P specification standard. The search and the listen phase are randomly carried out between the first device 102 and the second device 104.

In step 718b, a gesture on the remember icon from the user for selecting the second device 104 is received. In step 720b, an initial connection is initiated by the first device 102 with the second device 104 by sending a provision discovery request including the bootstrap information. In step 722b, the initial connection is established by the first device 102 with the second device 104. In step 724b, the initial connection is terminated after completing the data transfer between the first device 102 and the second device 104 and the same process will be followed as described above from step 702b in the case of a new connection initiated between the first device 102 and the second device 104.

The various actions, acts, blocks, steps, and the like in the method may be performed in the order presented, in a different order or simultaneously. Further, in an embodiment of the present invention, some actions, acts, blocks, steps, and the like may be omitted, added, modified, skipped, and the like without departing from the scope and spirit of the invention.

Figure 8:
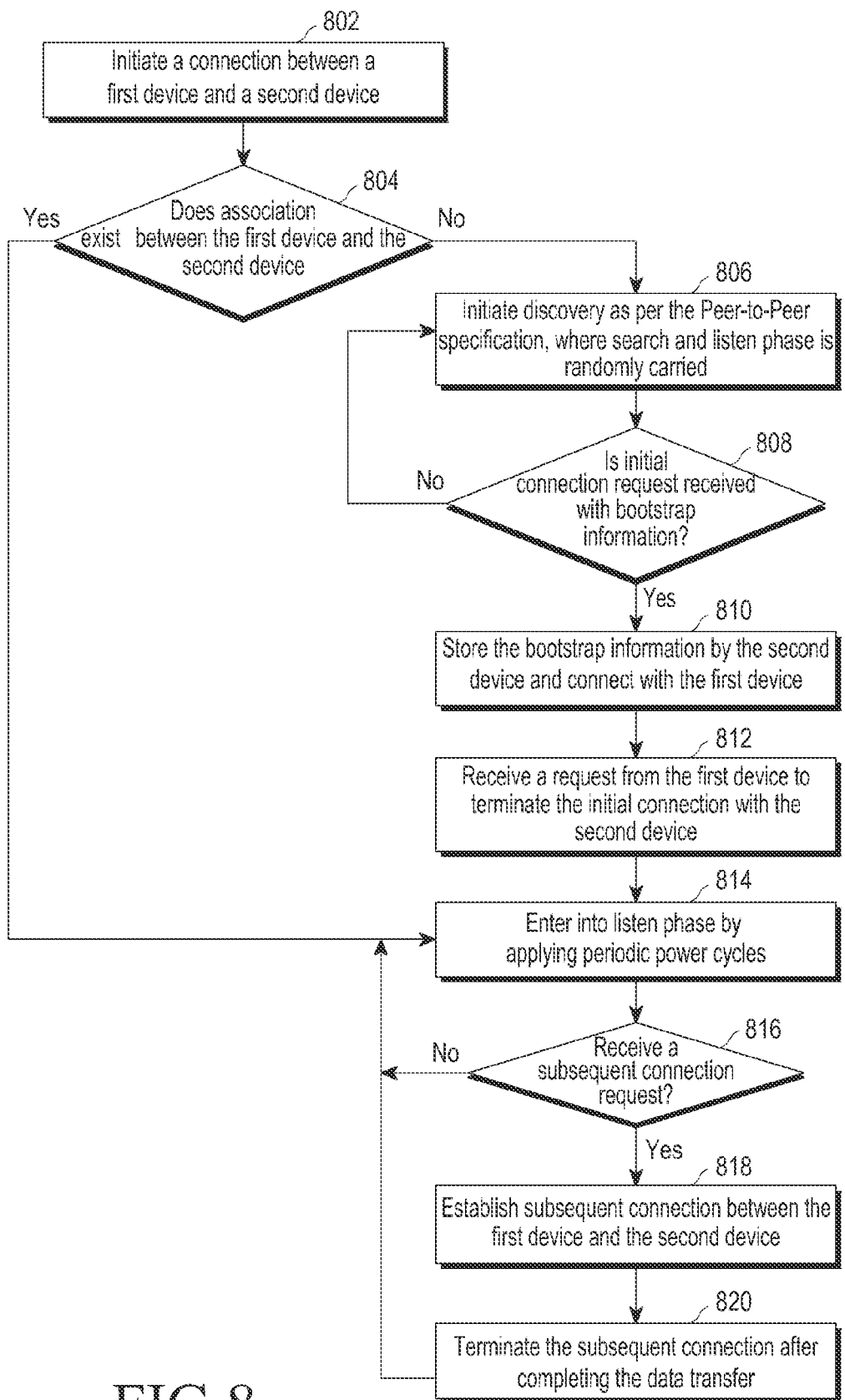
FIG. 8 is a flowchart of a method of receiving a subsequent connection request to establish a subsequent connection from a first device by a second device, according to an embodiment of the present invention.

FIG. 8 is a flowchart of a method of establishing a subsequent connection request to establish the subsequent connection from the first device 102 by the second device 104, according to an embodiment of the present invention. In step 802, a connection between the first device 102 and the second device 104 is initiated. If it is determined, in step 804, that an association exists between the first device 102 and the second device 104 then, in step 814, a listen phase is entered by applying the periodic power cycles.

If it is determined, in step 804, that an association does not exist between the first device 102 and the second device 104 then, in step 806, a discovery process is initiated as per the P2P specification standard. The search phase and the listen phase are randomly carried out. If it is determined, in step 808, that the connection request with the bootstrap information is received by the second device 104 from the first device 102 then, in step 810, the second device 104 stores the bootstrap information and connects with the first device 102. If it is determined, at step 808, that the connection request with the bootstrap request is not received by the second device 104 from the first device 102 then, at step 806, the method includes initiating the discovery process as per the P2P specification standard. At step 812, the method includes receiving the request from the first device 102 to terminate the initial connection with the second device 104 after the data transfer is completed. At step 814, the method includes entering into the listen phase by applying the periodic power cycles. If it is determined, at step 816, that the subsequent connection request is received by the second device 104 from the first device 102 then, at step 818, the method includes establishing the subsequent connection between the first device 102 and the second device 104. If it is determined, at step 816, that the discovery request subsequent connection request is not received by the second device 104 from the first device 102 then, at step 814, the method includes entering into the listen state by applying the periodic power cycles. At step 820, the method includes terminating the subsequent connection by the first device 102 with the second device 104 after completing the data transfer. Further, after terminating the subsequent connection, the second device 104 enters into the listen state by applying the periodic power cycles.

The various actions, acts, blocks, steps, and the like in the method may be performed in the order presented, in a different order or simultaneously. Further, in an embodiment of the present invention, some actions, acts, blocks, steps, and the like may be omitted, added, modified, skipped, and the like without departing from the scope and spirit of the invention.

Figure 9A:
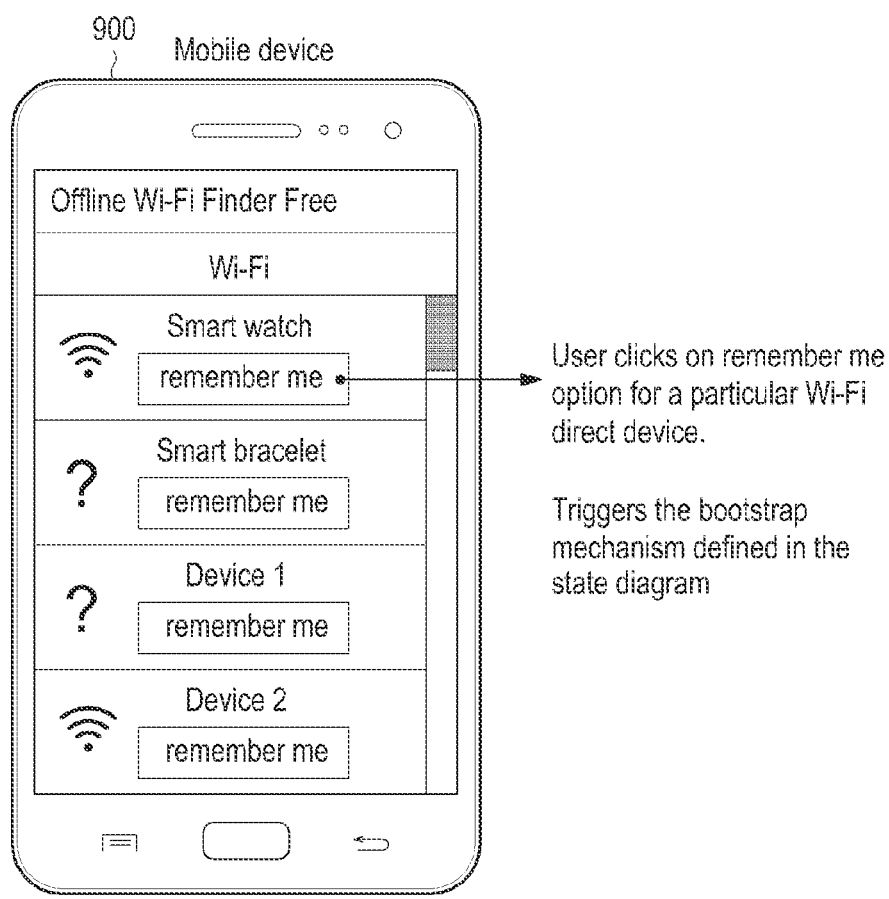
FIGS. 9A and 9B are illustrations of a system for establishing a subsequent connection between a mobile device and a smart watch, according to an embodiment of the present invention.
Figure 9B:
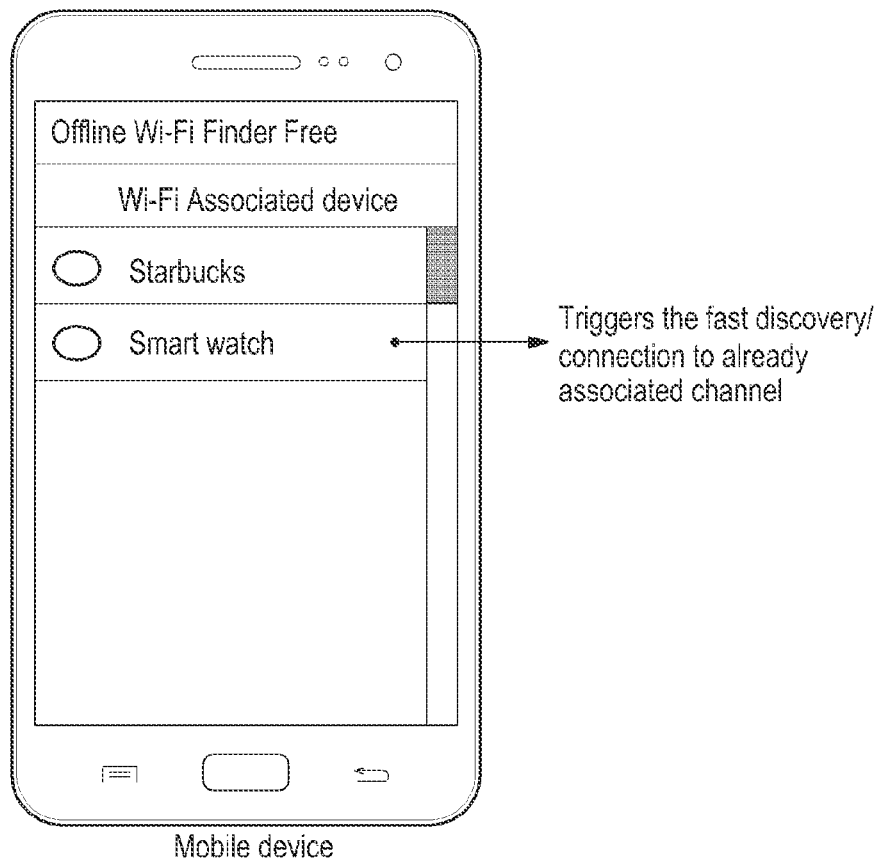

FIGS. 9A and 9B are illustrations of a system for establishing a subsequent connection between the mobile phone and the smart watch, according to embodiments as disclosed herein. The triggering of the bootstrapping mechanism in the mobile device is described as shown in the FIG. 9A.

Referring to FIG. 9A, initially, the mobile device 900 initiates a discovery process to search for nearby devices in the vicinity. Further, the mobile device 900 discovers multiple devices in the vicinity associated with the user as shown in the FIG. 9A. The multiple devices are displayed on the UI of the mobile device 900. Further, a remember me icon will be displayed along with the multiple devices as shown in the FIG. 9A.

Further, if the user selects the remember me icon for the smart watch from the list of multiple devices displayed on the UI of the mobile device 900 then the bootstrapping information will be negotiated between the mobile device 900 and the smart watch followed by the establishment of an initial connection by the mobile device 900 with the smart watch. Further, the mobile device 900 terminates the initial connection with the smart watch after completing the data transfer.

Referring to FIG. 9B, if the user tries to connect with the smart watch again then, the user accesses the Wi-Fi settings panel in the mobile device 900 as shown in FIG. 9B. Further, the list of devices including the smart watch is displayed to the user, where the mobile device 900 has already negotiated the bootstrap information with the smart watch. The mobile device 900 automatically triggers the subsequent connection with the smart watch to connect quickly based on the bootstrap information negotiated during the initial connection after receiving the gesture from the user thus, improving the user experience.

Figure 10:
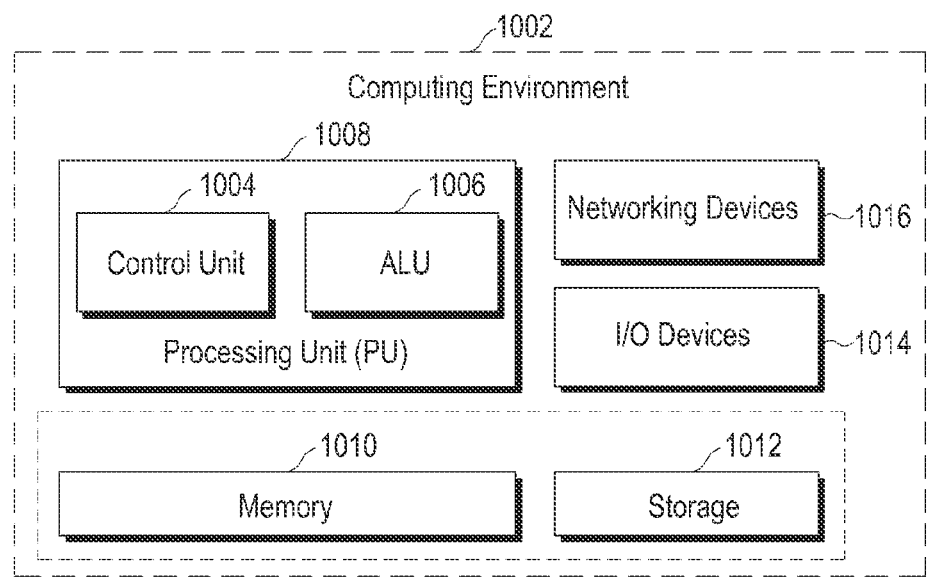
FIG. 10 is a block diagram of a computing environment implementing a method and system for establishing a subsequent connection between a first device and a second device, according to an embodiment of the present invention.

FIG. 10 is a block diagram of a computing environment implementing a method and system for establishing a subsequent connection between the first device 102 and the second device 104, according to an embodiment of the present invention.

Referring to FIG. 10, a computing environment 1002 comprises at least one processing unit 1008 that is equipped with a control unit 1004 and an Arithmetic Logic Unit (ALU) 1006, a memory 1010, a storage unit 1012, a plurality of networking devices 1016 and a plurality of Input/Output (I/O) devices 1014. The processing unit 1008 is responsible for processing the instructions of the algorithm. The processing unit 1008 receives commands from the control unit 1004 in order to perform its processing. Further, any logical and arithmetic operations involved in the execution of the instructions are computed with the help of the ALU 1006.

The overall computing environment 1002 can be composed of multiple homogeneous and/or heterogeneous cores, multiple Central Processing Units (CPUs) of different kinds, special media and other accelerators. The processing unit 1008 is responsible for processing the instructions of the algorithm. Further, the at least one processing units 1008 may be located on a single integrated circuit or chip or over multiple chips.

The algorithm comprising instructions and code required for the implementation are stored in either the memory unit 1010 or the storage 1012 or both. At the time of execution, the instructions may be fetched from the corresponding memory 1010 and/or storage 1012, and executed by the processing unit 1008.

In the case of a hardware implementation, various networking devices 1016 or external I/O devices 1014 may be connected to the computing environment 1002 to support the implementation through the networking devices 1016 and the I/O devices 1014.

Figure 11:
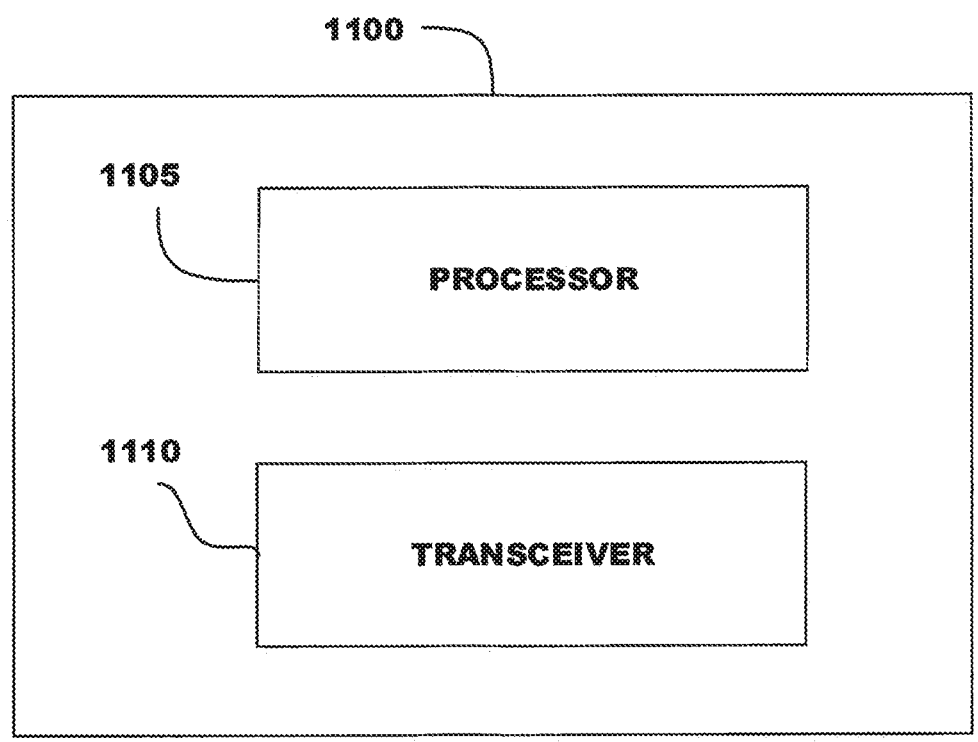
FIG. 11 is a block diagram of an electronic device according to an embodiment of the present invention.

FIG. 11 is a block diagram of an electronic device according to an embodiment of the present invention.

Referring to FIG. 11, the electronic device 1100 includes a processor 1105 and a transceiver 1110. For example, either or both of the first device 102 and the second device 104, as illustrated in FIGS. 1-4, may be configured as the electronic device 1100.

The embodiments disclosed herein can be implemented through at least one software program running on at least one hardware device and performing network management functions to control the elements. The elements shown in FIGS. 1 to 10 include blocks which can be at least one of a hardware device, or a combination of hardware device and software module.

The foregoing description of certain embodiments of the present invention so fully reveal the general nature of the embodiments herein that others can, by applying current knowledge, readily modify and/or adapt for various applications such embodiments without departing from the scope or spirit of the present invention, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, embodiments of the present invention have been described herein, those skilled in the art will recognize that the embodiments can be practiced with modification within the scope and spirit of the present invention, as defined by the appended claims and their equivalents.

What is claimed is:

1. A method of establishing a subsequent connection by a first device, the method comprising:
    transmitting, to a second device, a connection request including first bootstrap information to establish an initial connection with the second device, the first bootstrap information comprising information related to a role;
    receiving, from the second device, a successful connection response for the initial connection including second bootstrap information that includes information related to a role;
    establishing the initial connection with the second device in response to the successful connection response;
    terminating the initial connection with the second device; and
    establishing the subsequent connection with the second device which is in a listen state after terminating the initial connection by using the information related to the role included in the second bootstrap information,
    wherein the subsequent connection is established between the first device and the second device following the initial connection,
    wherein establishing the subsequent connection with the second device in the listen state comprises transmitting a subsequent connection request to initiate an association process, to the second device, based on the information related to the role, an internet protocol (IP) address included in the first bootstrap information, channel information, information related to an autonomous group owner (AutoGO), and the information related to the role included in the second bootstrap information, receiving a successful subsequent connection response, from the second device, in response to the subsequent connection request, and establishing the subsequent connection, with the second device, based on the information related to the AutoGO included in the first bootstrap information and the information related to the AutoGO included in the second bootstrap information, and
    wherein the channel information is information on an operating channel.

2. The method of claim 1, wherein establishing the subsequent connection with the second device in the listen state comprises:

transmitting a request for the subsequent connection to the second device; and receiving a response to the request for the subsequent connection from the second device.

3. The method of claim 1, wherein establishing the subsequent connection with the second device in the listen state comprises:

transmitting a discovery request, to the second device, using channel information in the second bootstrap information, wherein the discovery request is transmitted by considering a power profile associated with the second device;

receiving a discovery response, from the second device, including the role of the second device in the second bootstrap information of the second device;

transmitting a provision discovery request using the channel information in the second bootstrap information; and establishing the subsequent connection with the second device, in response to receiving a provision discovery response from the second device.

4. The method of claim 1, wherein establishing the subsequent connection with the second device in the listen state comprises:

transmitting the subsequent connection request, to the second device, using information on a listen channel in the second bootstrap information;

triggering a persistent group created during the initial connection;

receiving a successful subsequent connection response from the second device; and participating in the persistent group, based on the information related to the role included in the second bootstrap information, wherein the information related to the role included in the second bootstrap information is the role of the second device.

5. A first device for establishing a subsequent connection, the first device comprising:

a transceiver configured to transmit and receive data; and at least one processor coupled to the transceiver and configured to:

transmit, to a second device, a connection request including first bootstrap information to establish an initial connection with the second device, the first bootstrap information comprising information related to a role, receive, from the second device, a successful connection response for the initial connection including second bootstrap information comprising information related to a role, establish the initial connection with the second device in response to the successful connection response, terminate the initial connection with the second device, and establish the subsequent connection with the second device which is in a listen state after terminating the initial connection by using the information related to the role included in the second bootstrap information, wherein the subsequent connection is established between the first device and the second device following the initial connection, and wherein the at least one processor is further configured to transmit a subsequent connection request to initiate an association process, to the second device, based on the information related to the role, an internet protocol (IP) address included in the first bootstrap information, channel information, information related to an autonomous group owner (AutoGO), and the information related to the role included in the second bootstrap information, receive a successful subsequent connection response, from the second device, and establish the subsequent connection, with the second device, based on the information related to the AutoGO included in the first bootstrap information and the information related to the AutoGO included in the second bootstrap information, and wherein the channel information is information on an operating channel.

6. The first device of claim 5, wherein the at least one processor is further configured to:

transmit a discovery request, to the second device, using channel information in the second bootstrap information, wherein the discovery request is transmitted considering a power profile associated with the second device, receive a discovery response, from the second device, including the role of the second device in the second bootstrap information, transmit a provision discovery request, to the second device, using the channel information in the second bootstrap information, and establish the subsequent connection with the second device, in response to receiving a provision discovery response.

7. The first device of claim 5, wherein the at least one processor is further configured to:

transmit a subsequent connection request, to the second device, using information on a listen channel in the second bootstrap information, trigger a persistent group created during the initial connection, receive a successful subsequent connection response from the second device, and establish the subsequent connection with the second device, by participating in the persistent group based on the information related to the role included in the second bootstrap information, wherein the information related to the role included in the second bootstrap information is the role of the second device.

8. A second device for receiving a subsequent connection request, the second device comprising:

a transceiver configured to transmit and receive a data; and at least one processor coupled to the transceiver and configured to:

receive a connection request including first bootstrap information, from a first device, to establish an initial connection between the second device and the first device, the first bootstrap information comprising information related to a role, transmit, to the first device, a successful connection response including second bootstrap information comprising information related to a role, establish the initial connection with the first device, enter a listen state after the initial connection with the first device is terminated, receive the subsequent connection request, from the first device, to establish a subsequent connection between the second device and the first device by using the information related to the role included in the second bootstrap information, and transmit a subsequent connection response to the first device, wherein the subsequent connection is established with the first device in response to transmitting the subsequent connection response, wherein the subsequent connection is established between the first device and the second device following the initial connection, wherein the at least one processor is further configured to receive a subsequent connection request to initiate an association process, from the second device, based on the information related to the role, an internet protocol (IP) address included in the first bootstrap information, channel information, information related to an autonomous group owner (AutoGO), and the information related to the role included in the second bootstrap information, and transmit a successful subsequent connection response, to the second device, in response to the subsequent connection request, wherein the subsequent connection, with the second device, is established based on the information related to the AutoGO information included in the first bootstrap information and the information related to the AutoGO included in the second bootstrap information, and wherein the channel information is information on an operating channel.

9. The second device of claim 8, wherein the at least one processor is further configured to enter the listen state based on the channel information and a power profile associated with the second device included in the second bootstrap information, and wherein the power profile represents periodic sleep states for the second device in the listen state.

10. A non-transitory computer readable storage medium, having recorded thereon a computer program for executing a method comprising:

transmitting, by a first device, to a second device, a connection request including first bootstrap information to establish an initial connection with the second device, the first bootstrap information comprising information related to a role;

receiving, by the first device, from the second device, a successful connection response for the initial connection including second bootstrap information comprising information related to a role;

establishing, by the first device, the initial connection with the second device in response to the successful connection response;

terminating, by the first device, the initial connection with the second device; and establishing, by the first device, the subsequent connection with the second device which is in a listen state after terminating the initial connection by using the information related to the role included in the second bootstrap information, wherein the subsequent connection is established between the first device and the second device following the initial connection, and wherein establishing the subsequent connection with the second device in the listen state comprises transmitting a subsequent connection request to initiate an association process, to the second device, based on the information related to the role, an internet protocol (IP) address included in the first bootstrap information, channel information, information related to an autonomous group owner (AutoGO), and the information related to the role included in the second bootstrap information, receiving a successful subsequent connection response, from the second device, in response to the subsequent connection request, and establishing the subsequent connection, with the second device, based on the information related to the AutoGO included in the first bootstrap information and the information related to the AutoGO included in the second bootstrap information, and wherein the channel information is information on an operating channel.

11. A method of receiving a subsequent connection request by a second device, the method comprising:

receiving, from a first device, a connection request including first bootstrap information to establish an initial connection between the second device and the first device, the first bootstrap information comprising information related to a role;

transmitting, to the first device, a successful connection response including second bootstrap information;

entering a listen state after the initial connection with the first device is terminated;

receiving, from the first device, the subsequent connection request to initiate a subsequent connection between the second device and the first device by using information related to a role included in the second bootstrap information, and transmitting a subsequent connection response, to the first device, wherein the subsequent connection is established with the first device in response to transmitting the subsequent connection response, wherein the subsequent connection is established between the first device and the second device following the initial connection, wherein the at least one processor further comprises receiving the subsequent connection request to initiate an association process, to the second device, based on the information related to the role, an internet protocol (IP) address included in the first bootstrap information, channel information, information related to an autonomous group owner (AutoGO), and the information related to the role included in the second bootstrap information, and transmitting a successful subsequent connection response, to the second device, in response to the subsequent connection request, wherein the subsequent connection is established with the second device based on the information related to the AutoGO included in the first bootstrap information and the information related to the AutoGO included in the second bootstrap information, and wherein the channel information is information on an operating channel.

12. The method of claim 11, further comprising entering the listen state based on channel information and a power profile associated with the second device included in the second bootstrap information, wherein the power profile represents periodic sleep states for the second device in the listen state.

* * * * *